United States Patent
Febvre et al.

(10) Patent No.: US 7,532,891 B2
(45) Date of Patent: May 12, 2009

(54) METHOD AND APPARATUS FOR TIMING CORRECTION IN COMMUNICATIONS SYSTEMS

(75) Inventors: Paul Febvre, Suffolk (GB); David Denis Mudge, London (GB); Edward Arthur Jones, Essex (GB); Panagiotis Fines, London (GB)

(73) Assignee: Inmarsat Global Limited, London (GB)

( * ) Notice: Subject to any disclaimer, the term of this patent is extended or adjusted under 35 U.S.C. 154(b) by 59 days.

(21) Appl. No.: 10/798,550

(22) Filed: Mar. 12, 2004
(Under 37 CFR 1.47)

(65) Prior Publication Data
US 2004/0192201 A1   Sep. 30, 2004

Related U.S. Application Data

(62) Division of application No. 09/439,348, filed on Nov. 15, 1999.

(30) Foreign Application Priority Data
Mar. 5, 1999   (GB)   .................... 9905182.3

(51) Int. Cl.
H04W 72/00   (2006.01)
(52) U.S. Cl. .................. 455/450; 370/329; 370/321; 370/347; 370/337
(58) Field of Classification Search ................ 455/522, 455/450, 515, 504, 403, 3.05, 3.02, 13.2, 455/427, 12.1, 13.1; 370/311, 321, 432, 370/437, 316, 280, 477, 252, 468, 329, 347, 370/337
See application file for complete search history.

(56) References Cited

U.S. PATENT DOCUMENTS 3,641,274 A   2/1972   Sasaki et al.

(Continued)

FOREIGN PATENT DOCUMENTS

EP   0 364 190 A2   4/1990

(Continued)

OTHER PUBLICATIONS

Asker, J.R., "INMARSAT-3: The New Stars of Mobile Satellite Communication," *TRANSAT*, Issue 36, Jan. 1996, pp. 15-18.

(Continued)

*Primary Examiner*—Tu X Nguyen
(74) *Attorney, Agent, or Firm*—Sterne Kessler Goldstein & Fox, PLLC

(57) ABSTRACT

In a wireless communications system, transceivers transmit short bursts to a base station, which determines timing corrections from the time of receipt of the burst and transmits the timing corrections to the respective transceivers. In one aspect, the base station indicates to the transceivers a plurality of time slots, each transceiver selects one of the time slots at random, formats a burst including an indicator of the selected time slot and transmits the burst in that slot. In another aspect, the base station transmits to each transceiver a timing uncertainty value, which determines how the timing correction will be modified by the tranceiver as the interval since last receiving a timing correction increases. Data bursts are transmitted in a format comprising a first unique word, a content field and a second unique word, in that order. The bursts are transmitted in a TDMA channel format which can accommodate both short and long bursts in a block format of constant periodicity.

3 Claims, 11 Drawing Sheets

U.S. PATENT DOCUMENTS

| | | | |
|---|---|---|---|
| 4,285,064 A * | 8/1981 | Hodge | 455/13.1 |
| 4,346,470 A | 8/1982 | Alvarez et al. | 370/324 |
| 4,888,769 A | 12/1989 | Deal | 370/321 |
| 5,042,082 A | 8/1991 | Dahlin | 455/437 |
| 5,278,827 A | 1/1994 | Pound | 370/394 |
| 5,303,234 A | 4/1994 | Kou | 370/442 |
| 5,400,362 A | 3/1995 | Chennakeshu et al. | |
| 5,646,947 A | 7/1997 | Cooper et al. | |
| 5,661,764 A | 8/1997 | Nakajima | |
| 5,710,765 A | 1/1998 | Lee et al. | 418/36 |
| 5,771,459 A | 6/1998 | Demery et al. | 455/517 |
| 5,790,939 A | 8/1998 | Malcolm et al. | 455/13.2 |
| 5,822,314 A | 10/1998 | Chater-Lea | |
| 6,047,189 A * | 4/2000 | Yun et al. | 455/452.2 |
| 6,317,585 B1 * | 11/2001 | Shibasaki | 455/13.2 |
| 6,388,997 B1 | 5/2002 | Scott | 370/280 |
| 6,396,827 B1 | 5/2002 | Paivike et al. | 370/347 |
| 6,400,734 B1 | 6/2002 | Weigand | 370/514 |
| 6,414,945 B1 * | 7/2002 | Chennakeshu et al. | 370/317 |
| 6,535,563 B2 * | 3/2003 | Tiedemann et al. | 375/344 |
| 6,693,983 B1 | 2/2004 | Moher et al. | |
| 6,757,293 B1 * | 6/2004 | Chuah et al. | 370/432 |
| 7,187,903 B1 | 3/2007 | Febvre et al. | |
| 2001/0019541 A1 * | 9/2001 | Jou et al. | 370/311 |
| 2002/0028668 A1 * | 3/2002 | Grayson et al. | 455/403 |

FOREIGN PATENT DOCUMENTS

| | | | |
|---|---|---|---|
| EP | 0 722 228 A2 | 7/1996 |
| GB | 2 095 516 A | 9/1982 |
| GB | 2 259 387 A | 3/1993 |
| GB | 2 270 815 A | 3/1994 |
| GB | 2 277 232 A | 10/1994 |
| GB | 2277232 A | 10/1994 |
| GB | EP 629095 | 12/1994 |
| GB | 2 290 924 A | 1/1996 |
| GB | 2 301 734 A | 11/1996 |
| GB | 2301734 A | 12/1996 |
| GB | 2 319 699 A | 5/1998 |
| GB | 2 230 162 A | 6/1998 |
| GB | 2 343 594 A | 5/2000 |
| JP | 7-46660 A | 2/1995 |
| JP | 407046660 A | 2/1995 |
| WO | WO 89/11126 | 11/1989 |
| WO | WO 96/08885 A2 | 3/1996 |
| WO | WO 98/25358 | 6/1998 |
| WO | WO 9900931 | 1/1999 |
| WO | WO 99/34521 | 7/1999 |

OTHER PUBLICATIONS

ETS 300 175-2; Radio Equipment and Systems (RES); Digital European Cordless Telecommunications (DECT) Common Interface Part 2: Physical Layer™, European Telecommunications Standard, Oct. 1992, pp. 15-19, XP002135502.

European Search Report for Appln. No. EP 99 30 9030.7, Apr. 11, 2003 (date of completion of search), 6 pages.

* cited by examiner

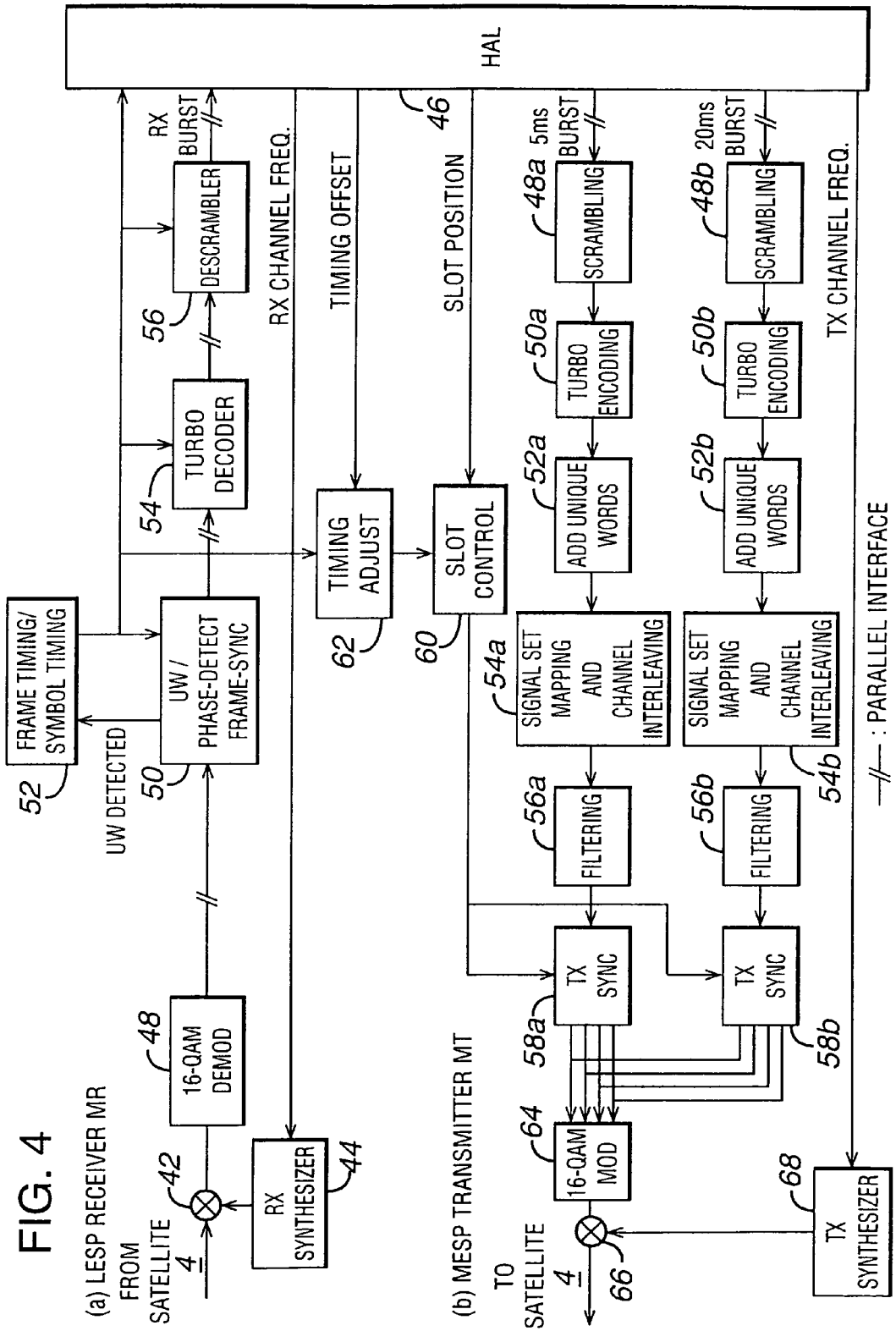

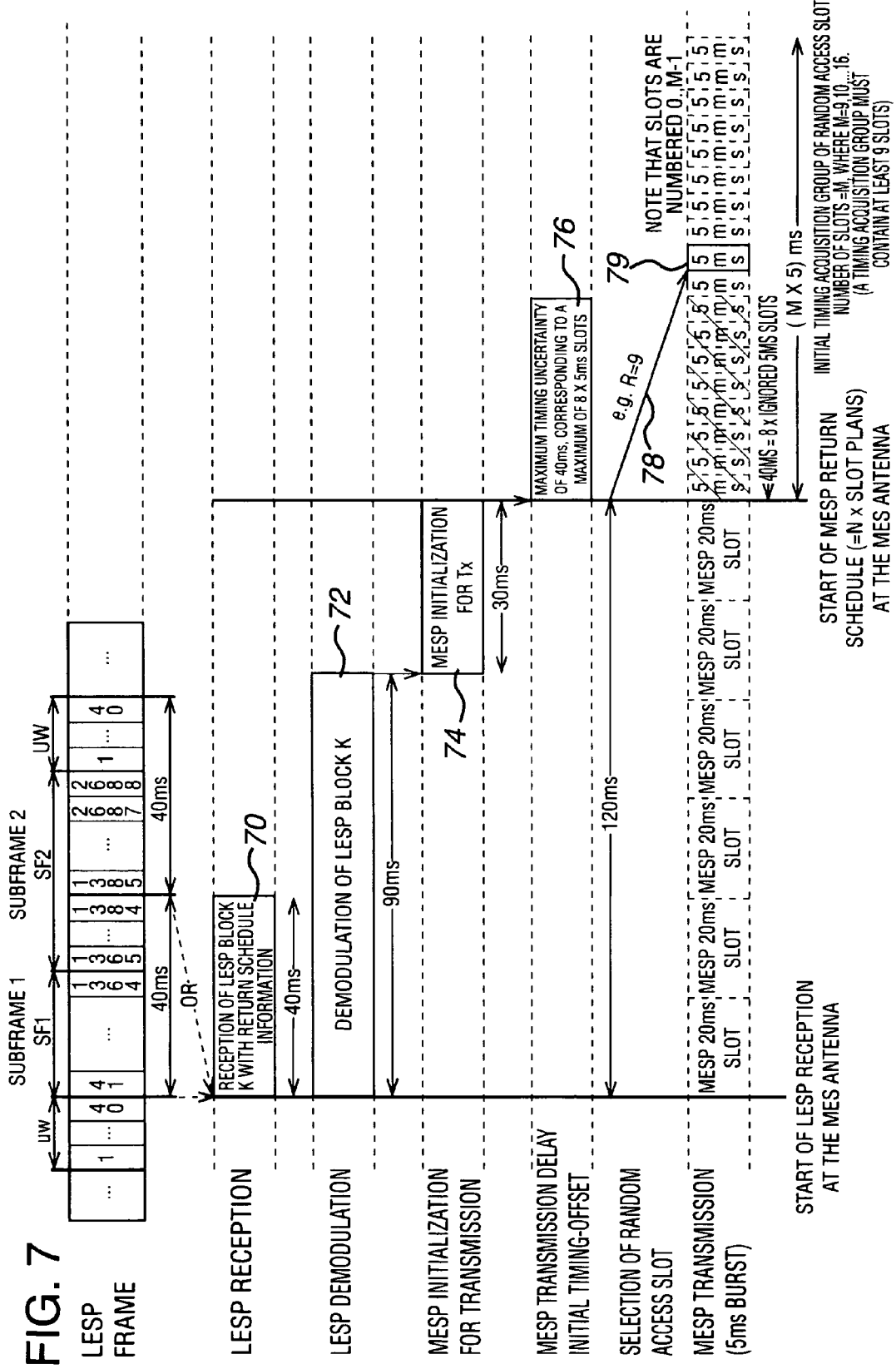

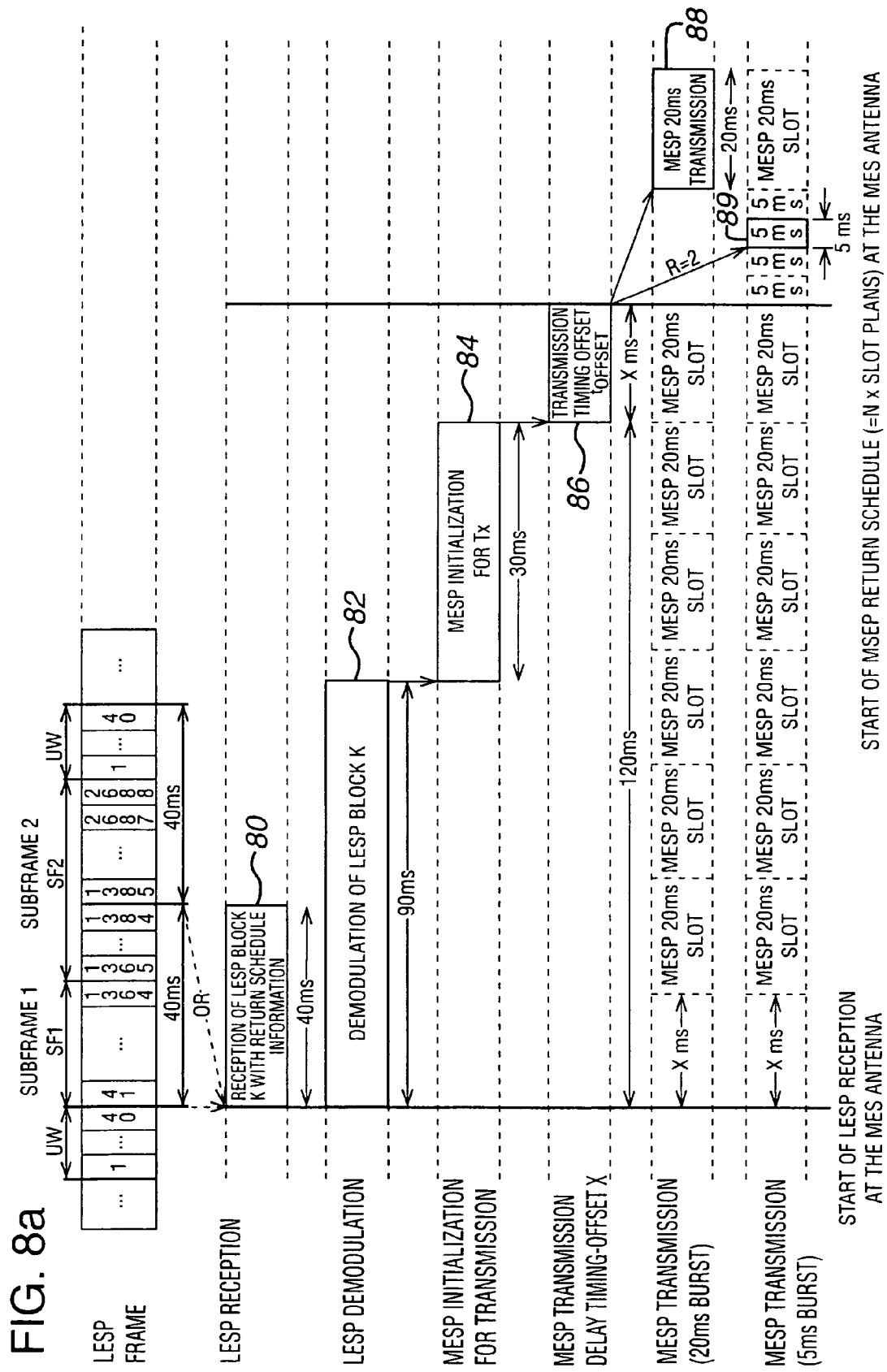

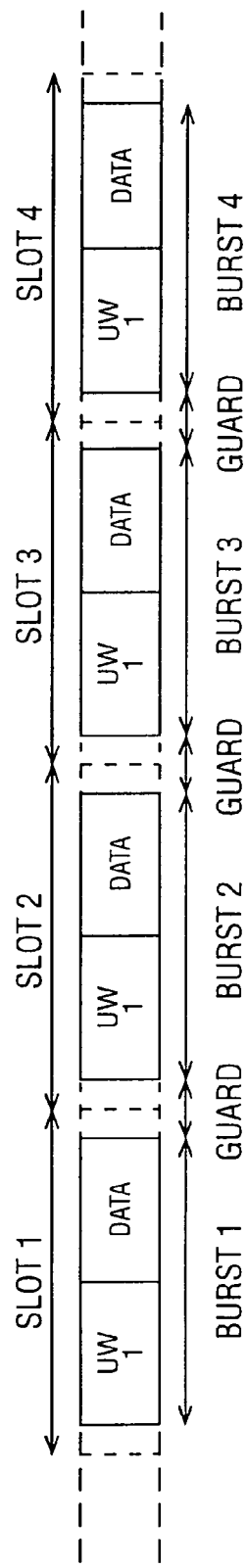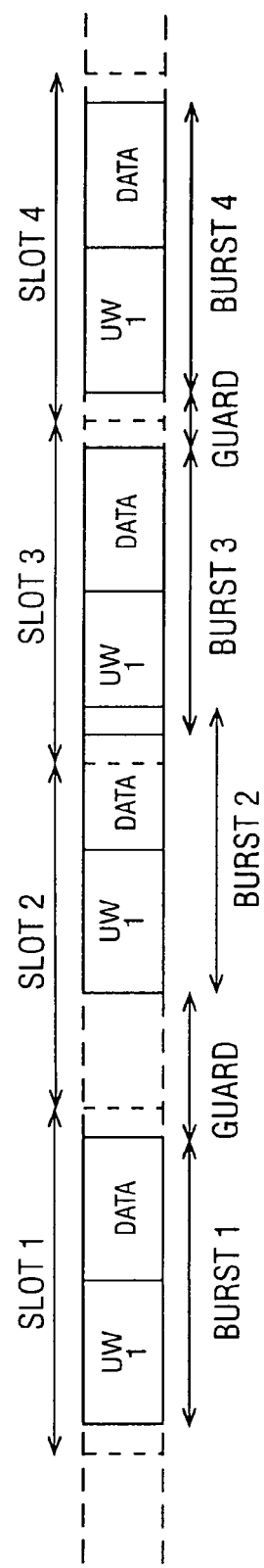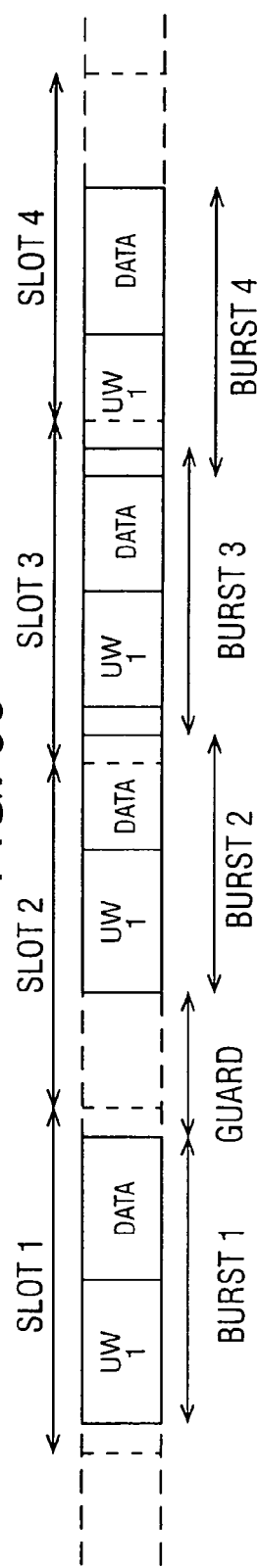

METHOD AND APPARATUS FOR TIMING CORRECTION IN COMMUNICATIONS SYSTEMS

CROSS REFERENCE TO RELATED APPLICATION

This application is a divisional of application Ser. No. 09/439,348, filed on Nov. 15, 1999, which is incorporated herein by reference in its entirety.

The present invention relates to communications apparatus and methods, particularly but not exclusively for wireless communications, particularly but not exclusively via satellite.

A problem associated with communications systems in which different transmitters share a time-divided channel resource is that timing misalignments may cause interference between the transmitters. The misalignments may be caused by drift in the transmitter clocks, or variations in the propagation delay from different transmitters to a common receiver. In time-divided multiple access (TDMA) channels, a guard band is usually provided between adjacent time slots, so that timing differences of less than the guard band time between transmissions in adjacent slots do not cause interference. However, the guard bands occupy bandwidth which could otherwise be used to carry traffic, so reliance on guard bands alone to avoid interference is not suitable for systems where a high bandwidth channel is shared by many transmitters.

The document U.S. Pat. No. 5,790,939 describes a TDMA based satellite communication system including a timing correction protocol. The system broadcasts timing corrections lo mobile terminals. Residual errors in the timing of individual terminals are corrected following transmission by the mobile terminals in a contention access channel. A gateway measures the residual timing error and reports the error back to the relevant mobile terminal.

Another problem associated with bursts in TDMA channels is that, if adjacent bursts do overlap, the interference between the bursts generally prevents either from being demodulated and decoded successfully. Burst formats for each time slot may include a unique word which aids acquisition of the burst, as described for example in U.S. Pat. No. 5,661,764, but the advantage of the unique word is lost if the burst interferes with an adjacent burst.

The document GB 2270815 describes a cellular mobile radio system with a packet reservation multiple access protocol, in which user traffic can be carried by both single and double slots, allocated dynamically by the base station according to load requirements. However, if the slot allocation is entirely flexible and can include slots of differing lengths, the timing alignment of bursts in those slots becomes complex.

According to aspects of the present invention, there is provided a timing correction method in a communications system, in which transceivers transmit short bursts to a base station, which determines timing corrections from the time of receipt of the bursts and transmits the timing corrections to the respective transceivers.

In one aspect, the base station indicates to the transceivers a plurality of time slots; each transceiver selects one of the time slots at random, formats a burst including a indicator of the selected time slot and transmits the burst In that slot. The base station can therefore determine the timing with which each transceiver transmitted the burst, but the probability of collision between bursts is reduced since they ate spread across the plurality of time slots.

In another aspect, the base station transmits to each transceiver a timing uncertainty value, which determines how the timing correction will be modified by the transceiver as the interval since last receiving a timing correction increases. Preferably, if the modification determined by the timing uncertainty value increases beyond a predetermined threshold, the transceiver inhibits transmission other than to request a timing correction. These measures advantageously reduce the likelihood of interference between slots, due to timing misalignment.

The above aspects of the present invention extend individually to those parts of the method which are carried out by the transceiver, those parts which are carried out by the network with which the transmitter communicates, and apparatus arranged to carry out those individual parts of the method.

According to another aspect of the present invention, there is provided a signal having a format comprising a first unique word, a content field and a second unique word, in that order. Preferably, there are no other fields in the burst before the first or after the second unique word which are necessary for the demodulation and decoding of the burst; this has the advantage that, if either the beginning or the end of the burst overlaps with another burst, it may still be possible to read the data content of the burst correctly. The content field may carry user data and/or signalling information. There may be an additional field before the first unique word and/or after the second unique word, but these are preferably auxiliary fields which are not essential to the decoding of the content field. For example, there may be a constant power preamble at the beginning of the burst to assist with power control in the transmitter. This aspect of the present invention extends to methods of formatting and/or transmitting such a signal, and apparatus arranged to perform such methods.

According to another aspect of the present invention, there is provided a TDMA channel format which can accommodate both short and long bursts in a block format of constant periodicity.

Specific embodiments of the present invention will now be described with reference to the accompanying drawings, in which:

FIG. 4 is a diagram of transmitter and receiver channel units in a Mobile Access Node (MAN) of the system of FIG. 1;

FIG. 7 is a timing diagram illustrating the operation of an initial timing correction protocol for correcting the timing of transmissions in the MESP channels;

FIG. 8a is a timing diagram illustrating the timing of a transmission in one of the MESP channels immediately following a timing correction;

FIGS. 9a to 9c are timing diagrams showing different collision scenarios between bursts of a conventional format in adjacent TDMA slots.

SYSTEM OVERVIEW

Figure 1:
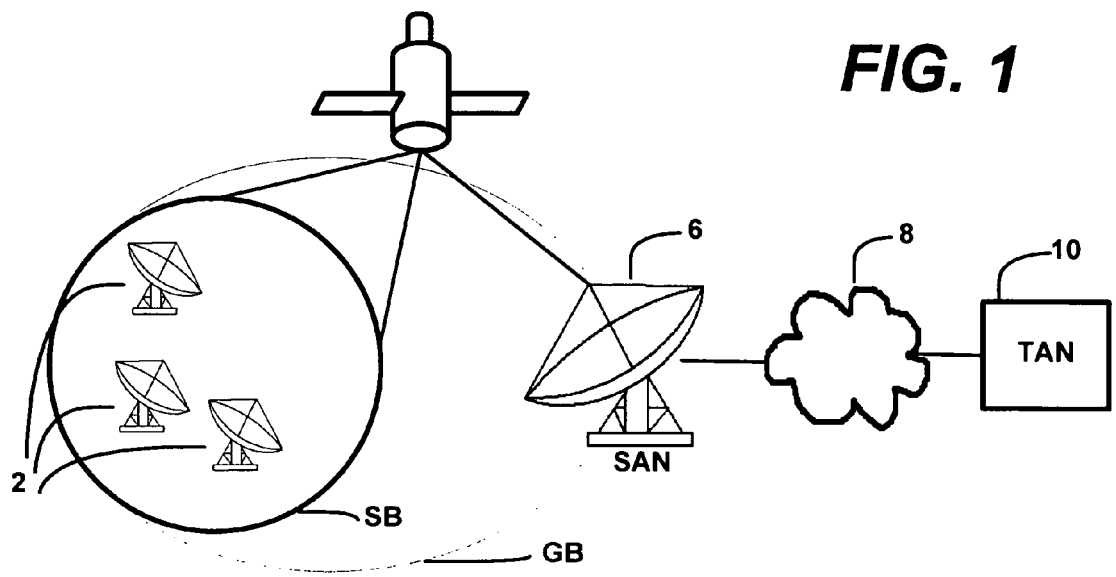
FIG. 1 is a diagram of components of a satellite communication system incorporating embodiments of the present invention.

FIG. 1 shows the principal elements of a satellite communications system in an embodiment of the present invention. A plurality of Mobile Access Nodes (MAN) 2 communicate via a satellite 4 with a satellite earth station, hereinafter referred to as a Satellite Access Node (SAN) 6. The satellite 4 may for example be an Inmarsat-3™ satellite, as described for example in the article 'Launch of a New Generation' by J R Asker, TRANSAT, Issue 36, January 1996, pages 15 to 18, published by Inmarsat, the contents of which are included herein by reference. The satellite 4 is geostationary and projects a plurality of spot beams SB (five spot beams in the case of an Inmarsat-3™ satellite) and a global beam GB, which encompasses the coverage areas of the spot beams SB, on the earth's surface. The MAN's 2 may be portable satellite terminals having manually steerable antennas, of the type currently available for use with the Inmarsat mini-M™ service but with modifications as described hereafter. There may be a plurality of SAN's 6 within the coverage area of each satellite 4 and capable of supporting communications with the MAN's 2 and there may also be further geostationary satellites 4 with coverage areas which may or may not overlap that of the exemplary satellite 4. Each SAN 6 may form part of an Inmarsat Land Earth Station (LES) and share RF antennas and modulation/demodulation equipment with conventional parts of the LES. Each SAN 6 provides an interface between the communications link through the satellite 4 and one or more terrestrial networks 8, so as to connect the MAN's 2 to terrestrial access nodes (TAN) 10, which are connectable directly or indirectly through further networks to any of a number of communications services, such as Internet, PSTN or ISDN-based services.

Channel Types

Figure 2:
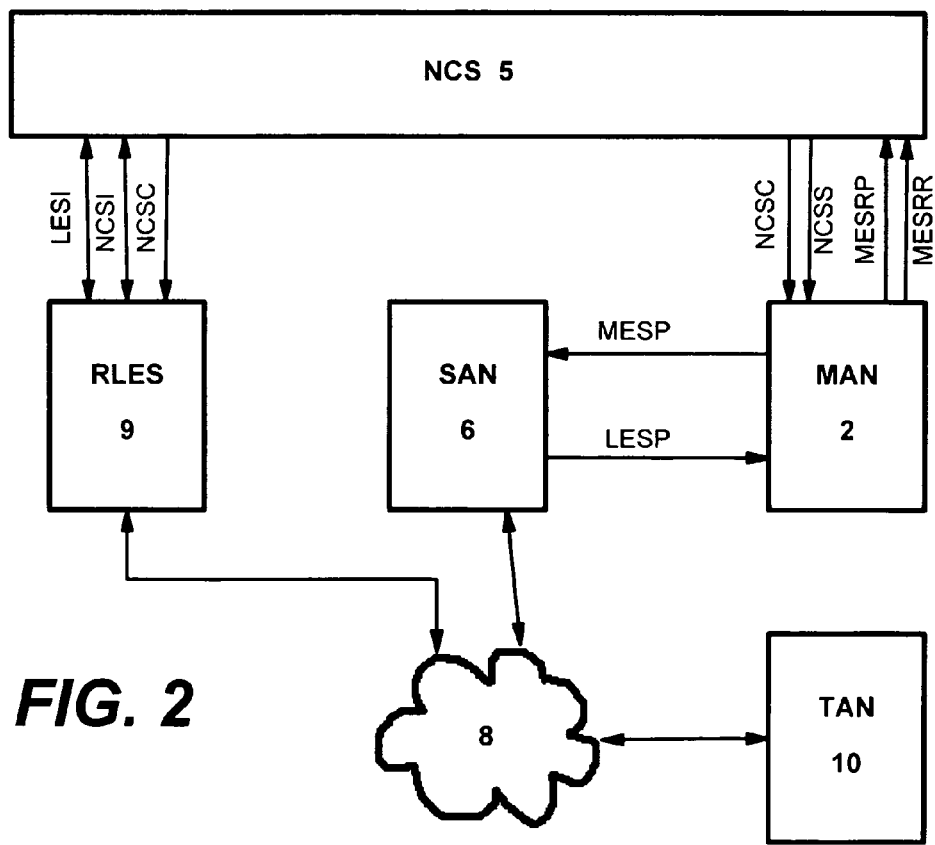
FIG. 2 shows the channels used for communication between the SAN and the MAN's in a packet data service implemented in the system of FIG. 1.

FIG. 2 shows the channels used for communication between a sample one of the MAN's 2 and the SAN 6. All communications under this packet data service from the MAN 2 to the SAN 6 are carried on one or more slots of one or more TDMA channels, referred to as MESP channels (mobile earth station—packet channels). Each MESP channel is divided into 40 ms blocks, divisible into 20 ms blocks. Each 20 ms block carries either one 20 ms burst or four 5 ms bursts, in a format which will be described below.

All communications under this packet data service from the SAN 6 to the MAN 2 are carried on one or more slots of one or more TDM channels, referred to as LESP channels (land earth station—packet channels). The slots are each 80 ms long, and comprise two subframes of equal length.

For the purposes of channel set-up and other network signalling, the MAN 2 also communicates with a network co-ordination station (NCS) 5, as is known in the Inmarsat Mini-M™ service. The SAN 6 communicates through the network 8 to a regional land earth station (RLES) 9 which communicates with the NCS 5 so as to perform channel set-up and other network signalling.

Satellite Link Interface

The present embodiments concern in particular a set of protocols and algorithms for the interface over the satellite link between the MAN's 2 and the SAN 6 to which the MAN's 2 are connected. This interface can be considered as a series of communications layers: a physical layer, a medium access control (MAC) layer and a service connection layer.

SAN Channel Unit

Figure 3:
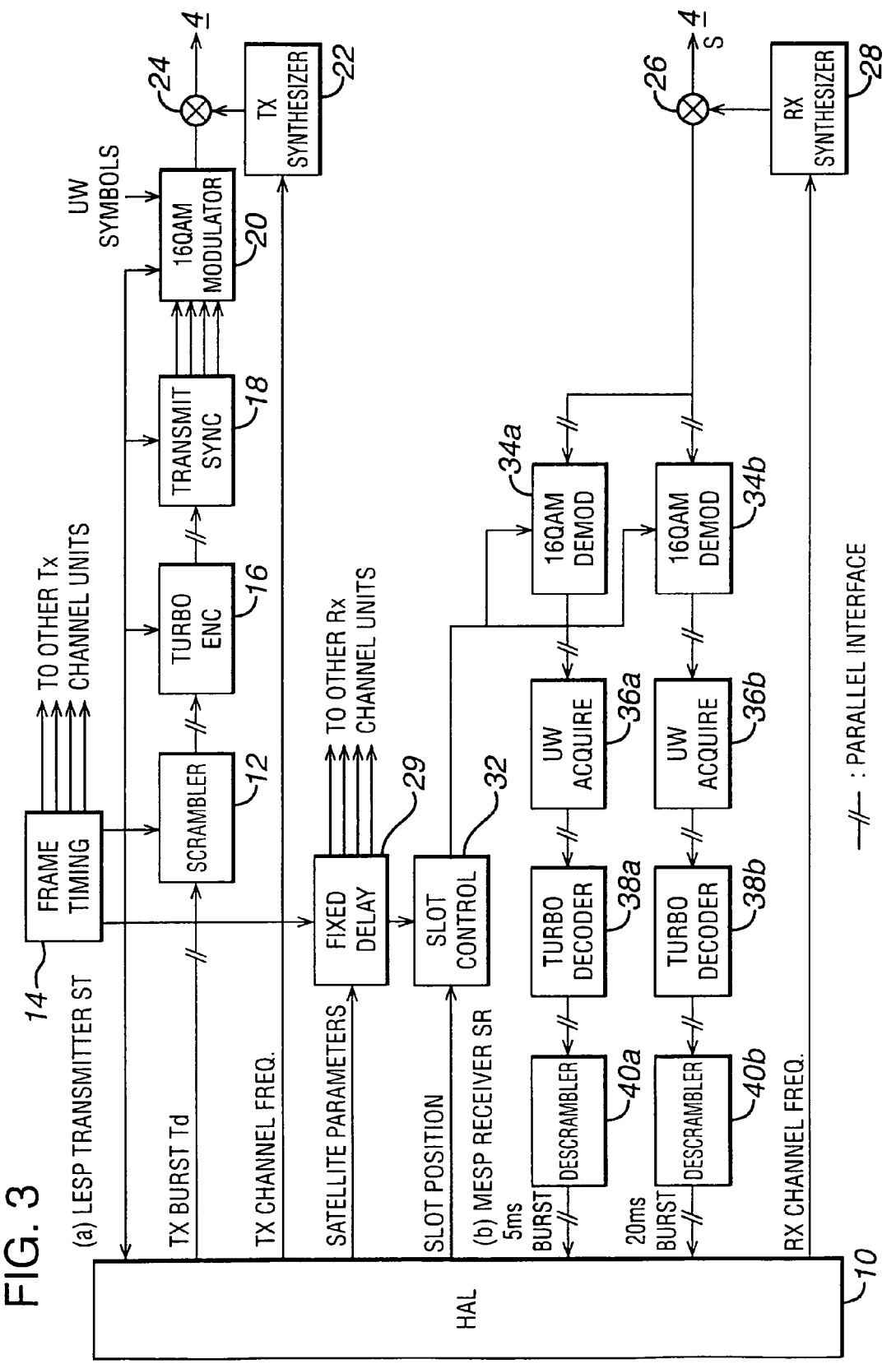
FIG. 3 is a diagram of transmitter and receiver channel units in a satellite access node (SAN) of the system of FIG. 1.

FIG. 3 shows the functions within the SAN 6 of a transmitter channel unit ST which performs the transmission of data packets over a single frequency channel of the satellite link, and a receiver channel unit SR, which performs the reception of data packets over a single frequency channel of the satellite link. Preferably, the SAN 6 includes multiple transmitter channel units ST and receiver channel units SR so as to be able to provide communications services to a sufficient number of MAN's 2.

A hardware adaptation layer (HAL) 10 provides an interface between the channel units and higher level software, and controls the settings of the channel units. In the transmitter channel unit ST, the HAL 10 outputs data bursts Td which are scrambled by a scrambler 12, the output timing of which is controlled by a frame timing function 14 which also provides frame timing control signals to the other transmitter channel units ST. The scrambled data bursts are then redundancy encoded by an encoder 16, by means for example of a turbo encoding algorithm as described in PCT/GB97/03551.

The data and parity bits are output from the encoder 16 to a transmit synchronising function 18 which outputs the data and parity bits as sets of four bits for modulation by a 16QAM modulator 20. Unique word (UW) symbols are also input to the modulator 20 according to a slot format which is described below. The output timing of the encoder 16, transmit synchroniser 18 and modulator 20 is controlled by the HAL 10, which also selects the frequency of the transmit channel by controlling a transmit frequency synthesiser 22 to output an upconversion frequency signal. This frequency signal is combined with the output of the modulator 20 at an upconverter 24, the output of which is transmitted by an RF antenna (not shown) to the satellite 4.

In the receiver channel unit SR, a frequency channel is received by an RF antenna (not shown) and downconverted by mixing with a downconversion frequency signal at a downconverter 26. The downconversion frequency signal is generated by a reception frequency signal synthesiser 28, the output frequency of which is controlled by the HAL 10.

In order to demodulate the received bursts correctly, the timing of reception of the bursts is predicted by a receive timing controller 29, which receives the frame timing control information from the frame timing function 14 and parameters of the satellite 4 from the HAL 10. These parameters define the position of the satellite 4 and of its beams and allow the timing of arrival of data bursts from the MAN's 2 to the SAN 6 to be predicted. The propagation delay from the SAN 6 to the satellite 4 varies cyclically over a 24 hour period as a result of the inclination of the satellite's orbit. This delay variation is similar for all of the MAN's 2 and is therefore used to modify the reference timing of the MESP channels, so that the timing of the individual MAN's 2 does not need to be modified to compensate for variations in satellite position.

The predicted timing information is output to each of the receive channel units SR. The received bursts are of either 5 ms or 20 ms duration according to a scheme controlled by the SAN 6. The HAL 10 provides information about the expected slot types to a slot controller 32, which also receives information from the receive timing controller 29.

FIG. 3 shows separate reception paths for 5 ms and 20 ms bursts; references to functions on each of these paths will be denoted by the suffixes a and b respectively. The slot controller 32 selects which reception path to use for each received burst according to the predicted length of the burst. The burst is demodulated by a 16QAM demodulator 34a/34b and the timing of the burst is acquired by a UW acquisition stage 36a/36b. Once the start and end of the burst is determined, the burst is turbo-decoded by a decoder 38a/38b and descrambled by a descrambler 40a/40b. The recovered 5 or 20 ms data burst is then received by the HAL 10.

MAN Channel Unit

FIG. 4 shows the functions within one of the MAN's 2 of a receiver channel unit MR and a transmitter channel unit MT. The MAN 2 may have only one each of the receiver and transmitter channel unit, for reasons of compactness and cost, but if increased bandwidth capacity is required, multiple receiver and transmitter channel units may be incorporated in the MAN 2.

In the receiver channel unit MR a signal is received by an antenna (not shown) and down-converted by a down-converter 42 which receives a down-conversion frequency signal from a receive frequency signal synthesiser 44, the frequency of which is controlled by an MAN hardware adaptation layer 46. The down-converted signal is demodulated by a 16QAM demodulator 48 which outputs the parallel bit values of each symbol to a UW detection stage 50, where the timing of the received signal is detected by identifying a unique word (UW) in the received signal. The timing information is sent to a frame and symbol timing unit 52 which stores timing information and controls the timing of the later stages of processing of the signal, as shown in FIG. 4. Once the block boundaries of the received data have been detected, the received blocks are turbo decoded by a decoder 54, descrambled by a descrambler 56 and output as received bursts to the HAL 46.

In the transmitter channel unit MT, data for bursts of 5 or 20 ms duration are output from the HAL 46. Separate paths identified by the suffixes a and b are shown in FIG. 4 for the 5 and 20 ms bursts respectively. The data is scrambled by a scrambler 48a/48b and encoded by a turbo encoder 50a/50b. Unique Words (UW) are added as dictated by the burst format at step 52a/52b and the resultant data stream is mapped onto the transmission signal set at step 54a/54b and filtered at step 56a/56b. The transmission timing is controlled at a transmission timing control step 58a/58b. At this step, the TDMA slot position is controlled by a slot control step 60 according to a designated slot position indicated by the HAL 46. A timing offset is output by the HAL 46 and is supplied to a timing adjustment step 62 which adjusts the timing of the slot control step 60. This timing offset is used to compensate for variations in propagation delay caused by the relative position of the MAN 2, the satellite 4 and the SAN 6 and is controlled by a signalling protocol, as will be described in greater detail below. The sets of data bits are output at a time determined according to the slot timing and the timing adjustment to a 16QAM modulator 64. The modulated symbols are upconverted by an upconverter 66 to a transmission channel frequency determined by a frequency output by a transmission frequency synthesiser 68 controlled by the HAL 46. The unconverted signal is transmitted to the satellite 4 by an antenna (not shown).

LESP Channel Format

Figure 5A:
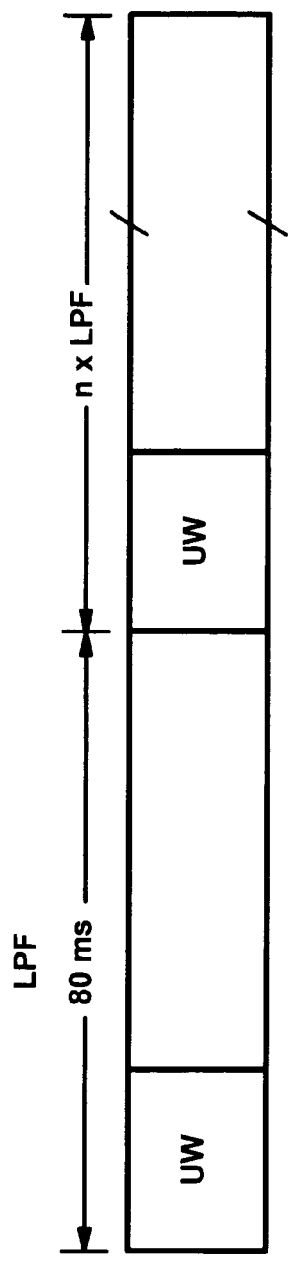
FIGS. 5a to 5d show the structure of one of the LESP channels of FIG. 4.

FIG. 5a shows the frame structure of one of the LESP channels. Each frame LPF has a duration of 80 ms and has a header consisting of a constant unique word UW which is the same for all frames. The unique word UW is used for frame acquisition, to resolve phase ambiguity of the output of the demodulator 48 and to synchronise the descrambler 56 and the decoder 54.

Figure 5B:
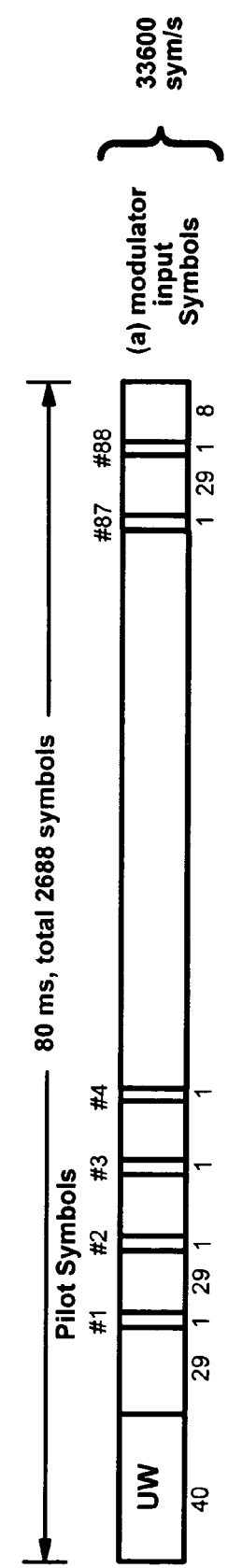
Figure 5C:
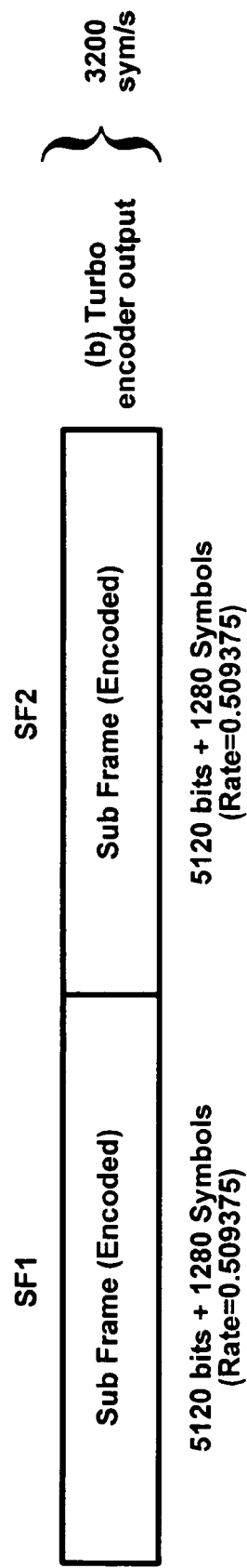
Figure 5D:
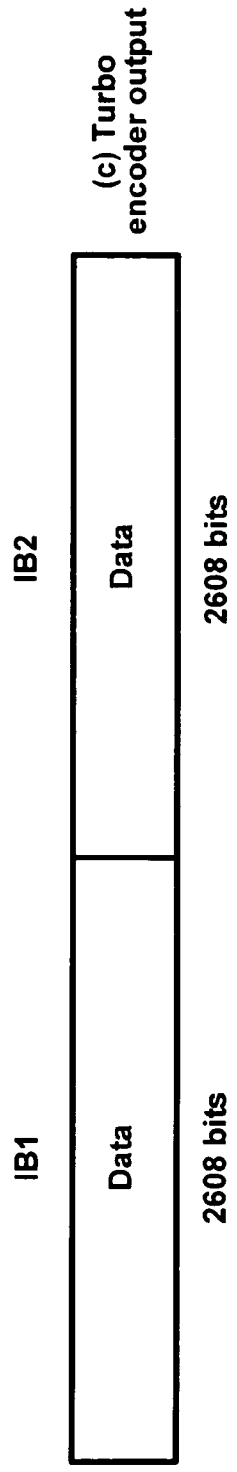

FIG. 5b shows the structure of each frame, which consists of the unique word UW of 40 symbols, followed by 88 blocks of 29 symbols each followed by a single pilot symbol PS, terminating in 8 symbols so as to make up the total frame length to 2688 symbols, of which 2560 are data symbols. These data symbols are divided, as shown in FIG. 5c, into two subframes SF1, SF2 each encoded separately by the encoder 16, each of 5120 bits, making 1280 symbols. The encoder 16 has a coding rate of 0.509375, so that each subframe is encoded from an input block IB1, IB2 of 2608 bits, as shown in FIG. 5d. This structure is summarised below in Table 1:

TABLE 1

LESP Frame Format

| Modulation | 16QAM |
|---|---|
| Data Rate (kbit/s) | 65.2 |
| Interface frame length (ms) | 80 |
| Interface Frame Size (bits) | 5120 |
| Subframe length (ms) | 40 |
| Input Bits per Subframe | 2608 |
| Coding Rate | 0.509375 |
| Output Bit per Subframe | 5120 |
| Output Symbol Per Subframe | 1280 |
| Frame Length (ms) | 80 |
| Data Symbol per Frame | 2560 |
| Pilot Symbol Insertion Rate | 1/(29 + 1) |
| Pilot Symbols per Frame | 88 |
| UW symbols | 40 |
| Frame Size | 2688 |
| Symbol Rate (ksym/s) | 33.6 |

MESP Channel Format

Figure 6A:
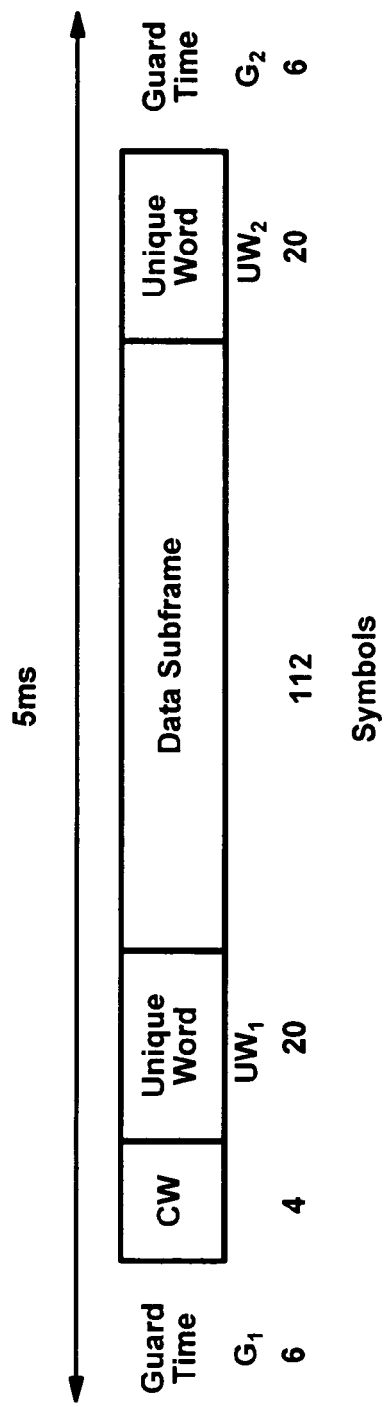
FIG. 6a shows the burst structure of a 5 ms burst in one of the MESP channels of FIG. 4.

The MESP channel structure is based on 40 ms blocks with a channel timing referenced to the timing of the associated LESP channel as received by the MAN's 2. Each 40 ms block can be divided into two 20 ms slots, each of which can be further divided into four 5 ms slots, and the division of each block into slots is determined flexibly by higher level protocols. FIG. 6a shows the format of a 5 ms burst, consisting of a pre-burst guard time G1 of 6 symbols, a preamble CW of 4 symbols, an initial unique word UW1 of 20 symbols, a data subframe of 112 symbols, a final unique word UW2 of 20 symbols and a post-burst guard time G2 of 6 symbols.

The preamble CW is not intended for synchronisation purposes by receivers (for example, the demodulators 30a, 30b) but conveniently provides a constant power level signal to assist the automatic level control of a high-power amplifier (HPA, not shown) in the transmitting MAN 2. In one example, each of the symbols of the preamble CW has the value (0,1, 0,0). In an alternative format, the preamble may consist of less than 4 symbols and the symbol times not used by the preamble CW are added to the pre-burst and post-burst guard times G1, G2. For example, the preamble CW may be omitted altogether and the pre-and post-burst guard times increased to 8 symbols each.

The unique words include only the symbols (1,1,1,1), which is mapped onto a phase of 45° at maximum amplitude, and (0,1,0,1), which is mapped onto a phase of 225° at maximum amplitude. Hence, the unique words are effectively BPSK modulated, although the symbols are modulated by the 16QAM modulator 64. Indicating the (1,1,1,1) symbol as (1) and the (0,1,0,1) symbol as (0), the initial unique word UW1 comprises the sequence 10101110011111100100, while the final unique word UW2 comprises the sequence of symbols 10111011010111000011.

The 5 ms burst is designed for carrying short signalling messages or data messages; the structure is summarised below in Table 2:

TABLE 2

5 ms Burst Structure

| Modulation | 16QAM |
|---|---|
| Input Bits per Burst | 192 |
| Coding rate | 3/7 |
| Output Bits per Burst | 448 |
| Output Symbols per Subframe | 112 |
| Preamble | 4 |
| Initial UW (symbols) | 20 |
| Final UW (symbols) | 20 |
| Total symbols | 152 |
| Total Guard Time (symbols) | 12 |
| Symbol Rate (ksym/s) | 33.6 |
| Slot Length (ms) | 5 |

Figure 6B:
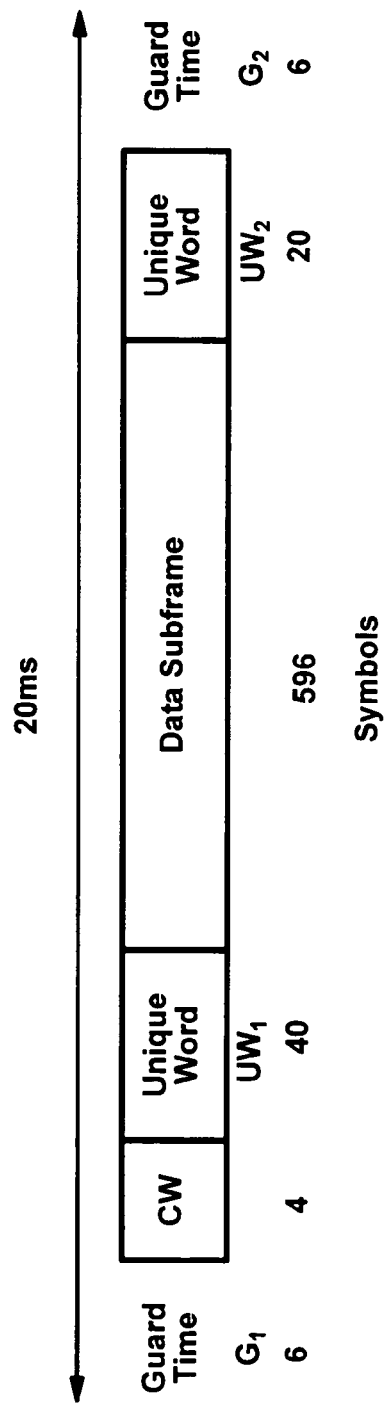
FIG. 6b shows the burst structure of a 20 ms burst in one of the MESP channels of FIG. 4.

FIG. 6b shows the structure of a 20 ms burst of the MESP channel. The same reference numerals will be used to denote the parts of the structure corresponding to those of the 5 ms burst. The structure consists of a pre-burst guard time G1 of 6 symbols, a preamble CW of 4 symbols, an initial unique word UW1 of 40 symbols, a data subframe of 596 symbols, a final unique word of 20 symbols and a post-burst guard time G2 of 6 symbols. The structure is summarised below in Table 3:

TABLE 3

20 ms Burst Structure

| Modulation | 16QAM |
|---|---|
| Input Bits per Burst | 1192 |
| Coding rate | 1/2 |
| Output Bits per Burst | 2384 |
| Output Symbols per Subframe | 596 |
| Preamble | 4 |
| Initial UW (symbols) | 40 |
| Final UW (symbols) | 20 |
| Total symbols | 660 |
| Total Guard Time (symbols) | 12 |
| Symbol Rate (ksym/s) | 33.6 |
| Slot Length (ms) | 20 |

The preamble CW has the same form and purpose as that of the 5 ms burst. The initial unique word UW1 comprises the sequence:

00000100110101001110000100011111100101101 while the final unique word UW2 comprises the sequence 11101110000011010010, using the same convention as that of the 5 ms burst.

MESP Timing Correction

As shown above, the MESP slot structure incorporates a very short guard time of about 0.24 ms at each end. However, the difference in the SAN 6 to MAN 2 propagation delay between the MAN 2 being at the sub-satellite point and at the edge of coverage is about 40 ms for a geostationary satellite, so the position of each MAN 2 will affect the timing of reception of transmitted bursts in the MESP channel, and may cause interference between bursts from MAN's 2 at different distances from the sub-satellite point Moreover the satellite, although nominally geostationary, is subject to perturbations which introduce a small inclination to the orbit and cause the distance between the satellite 4 and the SAN 6, and between the satellite 4 and the MAN 2, to oscillate. Although the position of the SAN 6 is fixed and that of the satellite 4 can be predicted, the MAN's are mobile and therefore their positions change unpredictably, and their clocks are subject to jitter and drift.

A timing correction protocol is used by the SAN 6 to measure the propagation delay from the MAN 2 and send a timing correction value to the MAN 2 to compensate for differences in propagation delay between the different MAN's 2, so as to avoid interference between bursts from different MAN's caused by misalignment with the slots. The protocol will now be illustrated with reference to the timing diagram of FIG. 7.

FIG. 7 shows LESP frames LPF including subframes SF1, SF2 and initial unique words UW. When the MAN 2 is switched on, or is able to acquire one of the LESP channels after an interval of not being able to do so, the MAN 2 receives (step 70) a 40 ms LESP subframe SF including return schedule information which dictates the slot usage of a corresponding MESP channel. Return schedule information is transmitted periodically with a periodicity controlled by the SAN 6. The subframe SF includes the designation of a block of at least nine contiguous 5 ms slots as a timing acquisition group consisting of random access slots not assigned to any specific MAN 2. The MESP return schedule to which the subframe SF relates begins 120 ms after the beginning of reception of the subframe SF. This 120 ms period allows 90 ms for the MAN 2 to demodulate the LESP subframe SF (step 72) and 30 ms for the MAN 2 to initialise itself for transmission (step 74).

At the beginning of the MESP return schedule there is allocated a timing allocation group of 5 ms slots. Initially, it is assumed that the MAN 2 has the maximum timing uncertainty of 40 ms, corresponding to eight 5 ms slots. Therefore, the MAN 2 can only transmit after the first eight slots of the timing acquisition group, and cannot transmit at all in acquisition groups containing less than nine slots, so as to avoid interfering with transmissions in slots preceding the timing acquisition group.

The MAN 2 randomly selects (step 78) one of the slots of the timing acquisition group following the first eight slots and transmits (step 79) a burst in the selected slot, the burst including an indication of the slot selected. In the example shown in FIG. 7, the slots of the timing acquisition group are numbered from 0 to M-1, where M is the number of slots in the timing acquisition group, and the number R, selected at random from 8 to M-1, is transmitted in the burst at step 79. The burst may also indicate the type of the mobile, such as land-based, maritime or aeronautical.

The SAN 6 receives and records the time of arrival of the burst transmitted by the MAN 2. From the slot number R indicated in the burst, the SAN 6 calculates the differential propagation delay to that MAN 2. Since the timing of transmission of the burst was (120+R×5) ms after the time of reception of the LESP subframe SF, the timing of reception $T_R$ of the burst is approximately $(2 \times DP + C + 120 + 5 \times R)$ ms after the time of transmission of the LESP subframe LPSF, where DP is the differential propagation delay to that MAN 2 and C is a delay which is the same for all the MAN's in a group, and includes various factors such as the propagation delay to and from the satellite 4 and the retransmission delay of the satellite 4. Hence, in this example, the differential propagation delay is calculated as:

$$DP = T_R - C - 120 - 5 \times R \quad (1)$$

The SAN 6 then transmits to the MAN 2 a data packet indicating a timing correction offset X in the range 0 to 40 ms.

The offset replaces the initial timing offset of 40 ms in step 76, for subsequent transmissions. The MAN 2 receives the timing correction offset and adjusts its transmission timing accordingly.

If the burst transmitted by the MAN 2 interferes with a burst transmitted by another MAN 2 also attempting to receive a timing correction, the SAN 6 may not be able to read the contents of either burst and in that case will not transmit a timing offset correction to either MAN 2. If the MAN 2 does not receive a timing offset correction from the SAN 6 within a predetermined time, the MAN 2 waits for a random interval within a predetermined range before attempting to transmit a burst in the next subsequently available timing acquisition group. The predetermined range of intervals is determined by a signalling packet transmitted by the SAN 6 which indicates maximum and minimum intervals to be observed by MAN's 2 after a first unsuccessful transmission before attempting transmission, together with a further waiting interval to be added to the total waiting interval each time a further retransmission is made following an unsuccessful transmission.

FIG. 8a illustrates the transmission timing of one of the MAN's 2 which has previously received a timing correction offset value X. As in FIG. 7, the MAN 2 receives (step 80) the LESP subframe SF which includes return schedule information. The MAN 2 demodulates (step 82) the LISP subframe LPSF and initialises (step 84) its transmitting channel unit, during a total allotted time of 120 ms after the beginning of reception of the LESP subframe LPSF. The MAN 2 calculates the start of the MESP return schedule as being (120|X) ms from the beginning of reception of the subframe SF which carries the return schedule information. The MAN 2 therefore waits for the timing offset period X (step 86) after the end of the 120 ms period before being able to transmit.

In this example, the return schedule dictated by the LESP subframe LPSF includes a four 5 ms slots, followed by a 20 ms slot. If the MAN 2 has been allocated a 20 ms slot, then it will transmit (step 88) in the designated 20 ms slot; if the MAN 2 has been allocated a 5 ms slot, then it will transmit in the designated 5 ms slot. Alternatively, if the 5 ms slots are designated as being random access slots and the MAN 2 has a short packet that is due to be sent to the SAN 6, the MAN 2 selects one of the four slots at random and transmits in that slot (step 89).

If the SAN 6 detects from the transmission by the MAN 2 that a correction in the timing offset is needed, for example if the time between the start of the burst and the slot boundary as measured by the SAN 6 is less than a predetermined number of symbols, the SAN 6 indicates a new timing correction to the MAN 2 in a subsequent data packet. This may be indicated as an absolute timing offset X or as a relative timing offset to be added or subtracted from the current value of X.

Timing Uncertainty

In the timing correction offset burst the SAN 6 transmits to the MAN 2, together with the timing offset, a timing uncertainty rate $R_U$ indicating the rate at which the timing of the MAN 2 is likely to change. For example, the timing uncertainty rate may represent a number of symbols pet second by which the MAN 2 is likely to change its timing. The SAN 6 determines the timing uncertainty rate from the class of the MAN 2 (e.g. land mobile, aeronautical) and other factors such as the inclination of the orbit of the satellite 6.

The MAN 2 times the interval elapsed since the last timing correction was received and multiplies this by the timing uncertainty rate $R_U$ to give a timing uncertainty $t_U$, where $$t_U = \mathrm{MIN}(T - T_C \times R_U, 40\ \mathrm{ms}) \quad (2)$$

where T is the current time and $T_C$ is the time at which the last correction was received. The MIN function means that the timing uncertainty cannot exceed the maximum uncertainty of 40 ms.

The timing offset X is reduced by the timing uncertainty $t_U$ such that:

$$X = \mathrm{MIN}(X_C - t_U, 0) \quad (3)$$

where $X_C$ is the initial value of X indicated in the last timing correction, the MIN function ensuring that X cannot fall below zero.

Figure 8B:
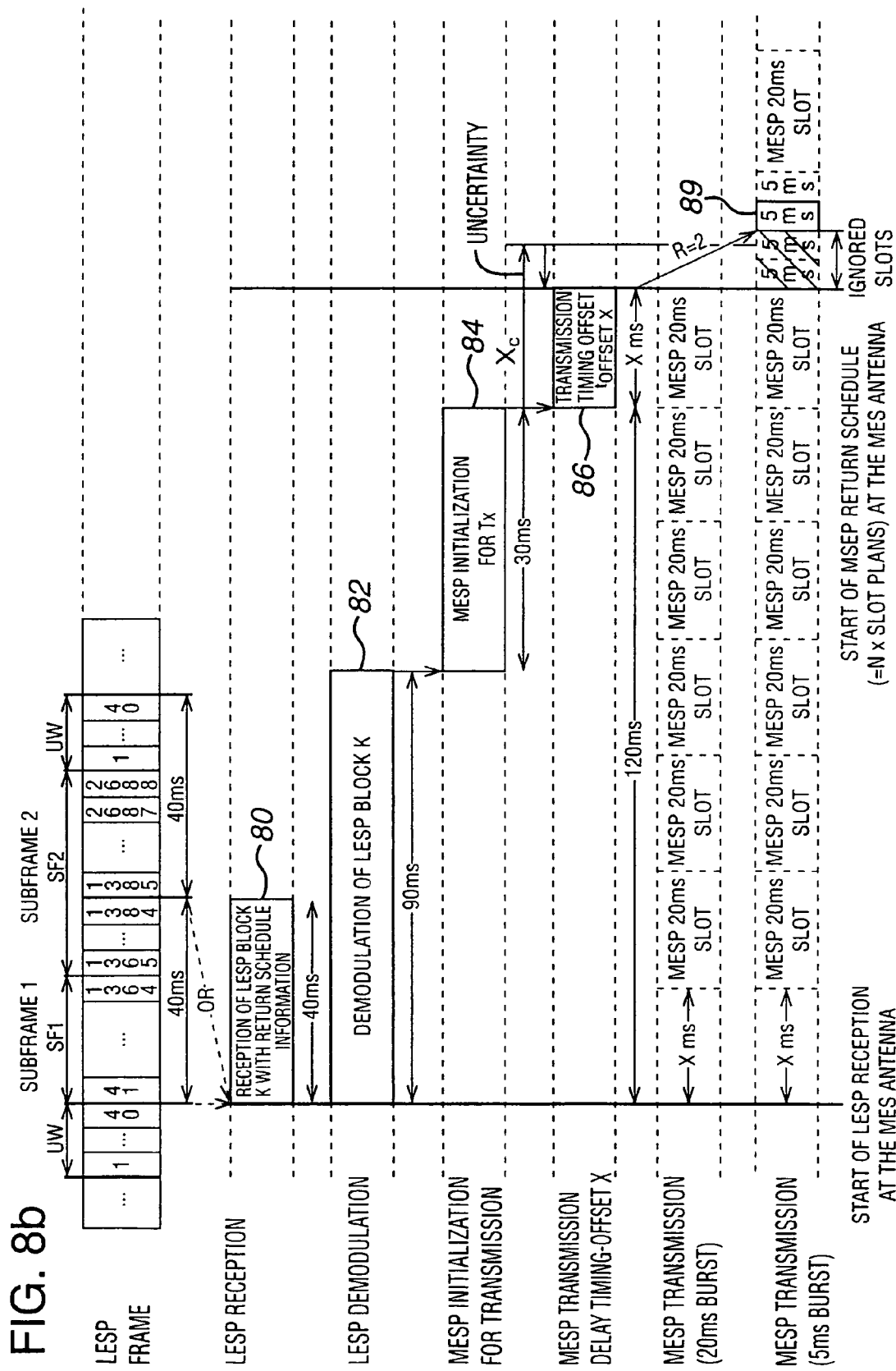
FIG. 8b is a timing diagram illustrating the timing of a transmission in one of the MESP channels at an interval after a timing correction, where there is timing uncertainty.

FIG. 8b illustrates the transmission timing of one of the MAN's 2 with timing uncertainty. Steps 80 to 84 correspond to those shown in FIG. 8a and their description will not be repeated. At step 86, the MAN 2 calculates the MESP return schedule as starting (120+X) ms after the beginning of reception of the subframe SF, using the value of X as reduced by the timing uncertainty $t_U$. As a result of the timing uncertainty $t_U$, the MAN 2 must ignore the first I slots of a random access group, where $$I = \mathrm{INT}[(t_S - t_G + t_U)/t_S] \quad (4)$$

$t_S$ is the slot duration of 5 ms and $t_G$ is the guard time G1, which is 6 symbol periods in this case.

In the example shown in FIG. 8b, there are four 5 ms slots at the start of the MESP return schedule, but $t_U$ is 7 ms, so that the first two slots must be ignored. The MAN 2 can then only transmit in the third and fourth slots.

If the timing uncertainty $t_U$ is greater than a predetermined value, such as the value of the guard time, the MAN 2 reverts to the random access timing correction request process shown in FIG. 7 and inhibits transmission in time slots allocated exclusively to itself, except where a sufficient number of these are concatenated so that their total length can accommodate both the timing uncertainty and the burst itself, until a new timing correction offset has been received from the SAN 6. However, the protocol differs from that of FIG. 7 in that the MAN 2 uses its current timing offset X instead of returning to the default value of 40 ms in step 76. This protocol reduces the chance of interference between bursts in allocated slots.

In the above embodiment, the timing offset X is reduced by the timing uncertainty $t_U$ for all transmissions by the MAN 2. In an alternative embodiment, the timing offset X is reduced by the timing uncertainty $t_U$ only for transmissions by the MAN 2 in random access slots, while the original timing offset $X_C$ received in the last timing correction message from the SAN 6 is applied when transmitting in allocated slots. In this alternative embodiment, it is important to distinguish between tiring correction messages initiated by the SAN 6, after detection of a transmission by the MAN 2 in an allocated slot too close to the slot boundary, and timing correction messages sent by the SAN 6 in response to a timing correction request by the MAN 2, which will have a different timing offset from the transmissions in allocated slots. Therefore, the SAN 6 indicates in the timing correction message whether this is being sent in response to a request by the MAN 2, or was initiated by the SAN 6. The MAN 2 then determines the new timing offset $X_C$ from the timing offset indicated in the timing correction message according to how the timing correction message was initiated.

Unique Word Structure

Figure 10A:
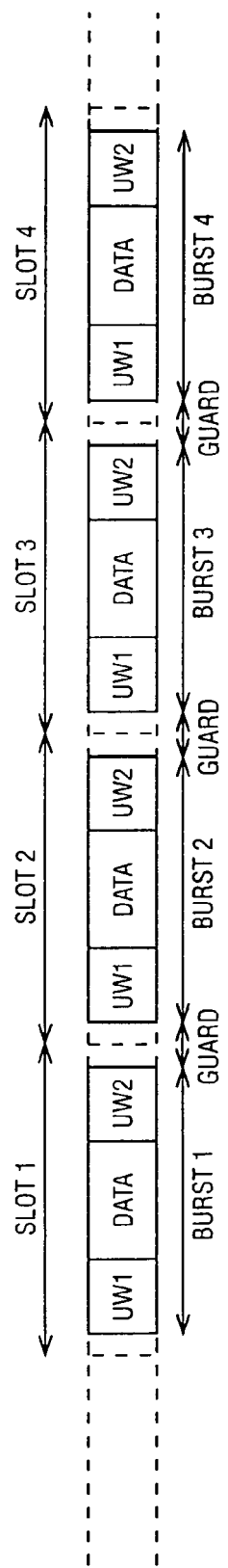
FIGS. 10a to 10c are timing diagrams showing the equivalent collision scenarios between bursts of a format according to an embodiment of the present invention.
Figure 10B:
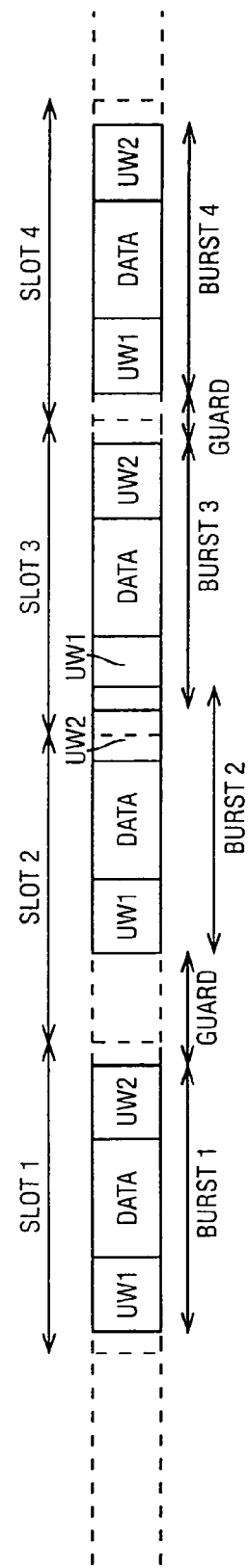
Figure 10C:
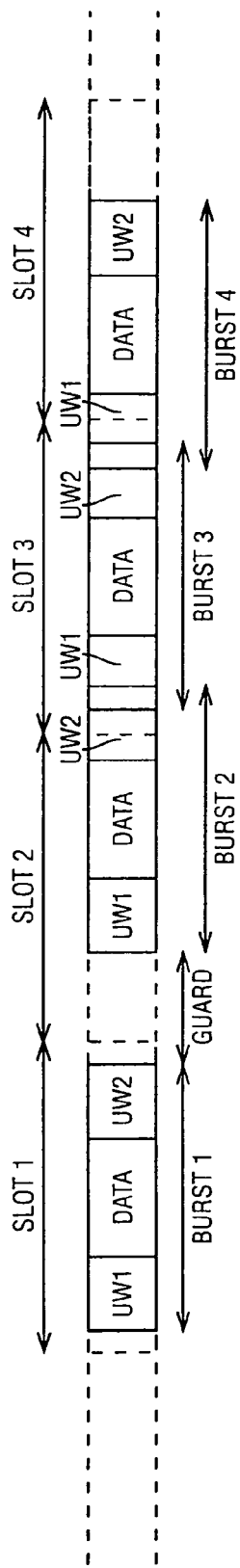

As shown in FIGS. 6a and 6b, each MESP burst includes an initial unique word UW1 and a final unique word UW2. This format is particularly advantageous for TDMA channels with short guard times between slots. By way of comparison, FIGS. 9a to 9c show a conventional burst structure with initial unique word only, respectively with no collision, two-burst collision and three-burst collision, while FIGS. 10a to 10c show the equivalent situations with both an initial and final UW structure.

As shown in FIG. 9b, if burst 2 transmitted in slot 2 is delayed because of timing error, the data contents of burst 2 interfere with the UW of burst 3 in slot 3 and may both be corrupted, possibly preventing the data contents of burst 3 from being read correctly as a result of a failure to acquire the symbol timing of burst 3. However, in the situation shown in FIG. 10b, the final UW of burst 2 interferes with the initial UW of burst 3, but in both bursts the data and one of the unique words is uncorrupted, giving a good chance of reading both data bursts.

In the situation shown in FIG. 9c, burst 2 is delayed and burst 4 is advanced, both as a result of timing errors. The data content of bursts 2 and 3, and the unique words of bursts 3 and 4, are corrupted so that it will be difficult to read any of the data contents of bursts 2 to 4. In contrast, in the situation shown in FIG. 10c, the final UW of burst 2, both unique words of burst 3 and the initial unique word of burst 4 are corrupted. Nevertheless, if the timing of bursts 2 and 4 can be acquired from the uncorrupted unique words, the corrupted unique words of bursts 2 and 4 can be synthesised and subtracted from the received signal of burst 3, allowing the corrupted unique words of burst 3 to be recovered and the data content of burst 3 to be read successfully.

The use of two unique words per burst also provides the advantages of time diversity: in the presence of fading or impulsive noise, the chance of two separate unique words being corrupted is less than that of one unique word of the combined length. The two unique words can be detected independently and the results combined before a timing decision is made.

In order to demodulate a received burst, the SAN 6 needs to estimate the carrier amplitude, phase and frequency. The estimated channel state is also used by the decoder 38a/38b. Since there is an UW present at both the beginning and end of each burst, the channel state at both the beginning and end of the burst can be determined, and optionally the channel state throughout the burst can be interpolated from these. This may result in improved demodulation and decoding performance. Furthermore, timing slip between the beginning and the end of the data burst can be detected; this is advantageous where there is considerable drift in the transmitter or receiver clock Commonly, the channel state cannot be estimated from the data burst itself, because the energy of the data portion is typically too low.

As a further advantage, the proposed unique word structure gives improved performance with high-power amplifiers (HPA). A common problem with HPA's is their slow ramp-up/down at the beginning and end of a burst. This may result in distortion or attenuation of symbols at the start and end of a burst. If these symbols were carrying encoded data, their distortion could lead to loss of the whole encoded data in the burst. With the proposed structure, only some of the UW symbols will be distorted, which is less likely to cause loss of the whole burst.

As a less advantageous alternative, additional fields may be transmitted in each burst either before the initial UW or after the final UW of the burst, or both. The additional fields may be additional data fields carrying additional data or signalling, or may carry further burst format signals designed to assist in the demodulation and/or decoding of the data content of the burst. However, such additional fields are vulnerable to interference and preferably should not carry data or signalling essential for demodulation and/or decoding of the burst.

The above embodiments have been described with reference to certain Inmarsat™ systems purely by way of example and aspects of the present invention are in no way limited thereto. For example, it will be readily understood to the skilled person that the problem of timing correction occurs in geo-stationary, geosynchronous and non-geostationary satellite systems and aspects of the present invention are applicable to these systems. Moreover, timing errors can occur for reasons such as clock instability as well as relative movement between satellites, base stations and wireless transceivers, so that aspects of the present invention are also applicable to wireless communication systems not using satellites as relay stations, such as terrestrial communications systems or systems involving alternative relay stations such as balloons or other aircraft.

Although the above embodiments have been described with reference to a TDMA channel format, it will be readily understood by the skilled person that the problem of interference as a result of timing error can occur with other channel formats, such as combined TDMA-CDMA, slotted Aloha and other time-divided formats and that aspects of the present invention are also applicable to such formats.

The description of the above embodiments includes a detailed description of the transmission formats of LESP and MESP channels. Aspects of these channel formats are particularly advantageous for packet data transmission via satellite, particularly via geostationary satellite and have been selected after considerable investigation of alternative formats, but may also be advantageous in different contexts. On the other hand, it will be apparent that some aspects of the present invention are entirely independent of the specific channel formats used.

While the apparatus of the specific embodiments has been described in terms of functional blocks, these blocks do not necessarily correspond to discrete hardware or software objects. As is well known, most baseband functions may in practice be performed by suitably programmed DSP's or general purpose processors and the software may be optimised for speed rather than structure.

The invention claimed is:

1. A method of controlling the transmission of data over a time-divided multiple access channel of a wireless communications link, comprising:
   determining an allocation scheme of said channel to each of a plurality of transceivers, and transmitting said allocation scheme to said transceivers,
   wherein said transceivers transmit data in said channel with a format including periodic blocks of constant length each occupied by either one long burst or a plurality of short bursts of equal length and wherein a length for each long burst occupying a block is constant,
   whereby the division of each block into either one long burst or a plurality of short bursts is determined flexibly.

2. The method of claim 1, further comprising:
   transmitting the data in one or more short bursts and/or one or more long bursts, the short bursts comprising 112 modulated data symbols and having a total length of approximately 5 ms, and the long bursts comprising 596 data symbols and having a total length of approximately 20 ms, and whereby the division of each block into either one long burst or a number of short bursts is determined flexibly.

3. A first transceiver that receives an allocation scheme for a time-divided multiple access channel to each of a plurality of transceivers including the first transceiver, wherein the allocation is received by each of the plurality of transceivers, and that transmits a wireless link signal having a format including periodic blocks of constant length each occupied by either one long burst or a plurality of short bursts of equal length and wherein a length for each long burst occupying a block is constant, whereby the division of each block into either one long burst or a plurality of short bursts is determined flexibly.

* * * * *